(12) United States Patent
Ruettiger et al.

(10) Patent No.: US 6,762,578 B2
(45) Date of Patent: Jul. 13, 2004

(54) MOTOR CONTROLLER FOR A MOTOR WITH FEEDBACK POTENTIOMETER

(75) Inventors: Anton Ruettiger, Wildflecken (DE); Mario Schmitt, Salz (DE)

(73) Assignee: Preh-Werke GmbH & Co. KG, Saale (DE)

(*) Notice: Subject to any disclaimer, the term of this patent is extended or adjusted under 35 U.S.C. 154(b) by 65 days.

(21) Appl. No.: 10/281,135

(22) Filed: Oct. 28, 2002

(65) Prior Publication Data

US 2003/0080705 A1 May 1, 2003

(30) Foreign Application Priority Data

Oct. 26, 2001 (DE) .......................... 101 52 996

(51) Int. Cl.$^7$ .............................................. H02K 29/06
(52) U.S. Cl. ...................... 318/437; 318/442; 388/838; 388/824; 388/923
(58) Field of Search ................................ 318/437, 442; 388/824, 838, 923

(56) References Cited

U.S. PATENT DOCUMENTS

| | | | |
|---|---|---|---|
| 4,143,706 A | * | 3/1979 | Schnaibel et al. .......... 165/202 |
| 4,941,319 A | * | 7/1990 | Yamamoto et al. ........... 60/314 |
| RE38,406 E | * | 1/2004 | Faris et al. .................. 388/831 |
| 2003/0159802 A1 | * | 8/2003 | Steneby et al. ................ 165/59 |

FOREIGN PATENT DOCUMENTS

| | | |
|---|---|---|
| DE | 37 27 499 A1 | 3/1989 |
| DE | 196 07 652 A 1 | 9/1997 |
| DE | 197 16 229 A 1 | 10/1998 |
| DE | 199 55 461 A1 | 5/2001 |

* cited by examiner

*Primary Examiner*—Rita Leykin
(74) *Attorney, Agent, or Firm*—Birch, Stewart, Kolasch & Birch, LLP

(57) ABSTRACT

The invention concerns a motor controller for a motor with a feedback potentiometer, preferably for central air valve actuation. In the field of climate control, for example for utility vehicles and motor vehicles, the air ducts in heating, air conditioning and/or ventilation systems have valves to control the flow of air or water. These valves are adjusted either mechanically, e.g. by Bowden cables or flexible shafts, or using motors. It is proposed that a continuous rotation potentiometer be employed as a feedback potentiometer and specially designed control electronics be used to control a motor with the continuous rotation potentiometer. In the control electronics for the motor controller, an angular difference between an adjusted control potentiometer and the motor feedback potentiometer is determined in order to determine therefrom the shortest adjustment path to the chosen setpoint position for the motor when the angular difference is greater than 180 degrees.

8 Claims, 1 Drawing Sheet

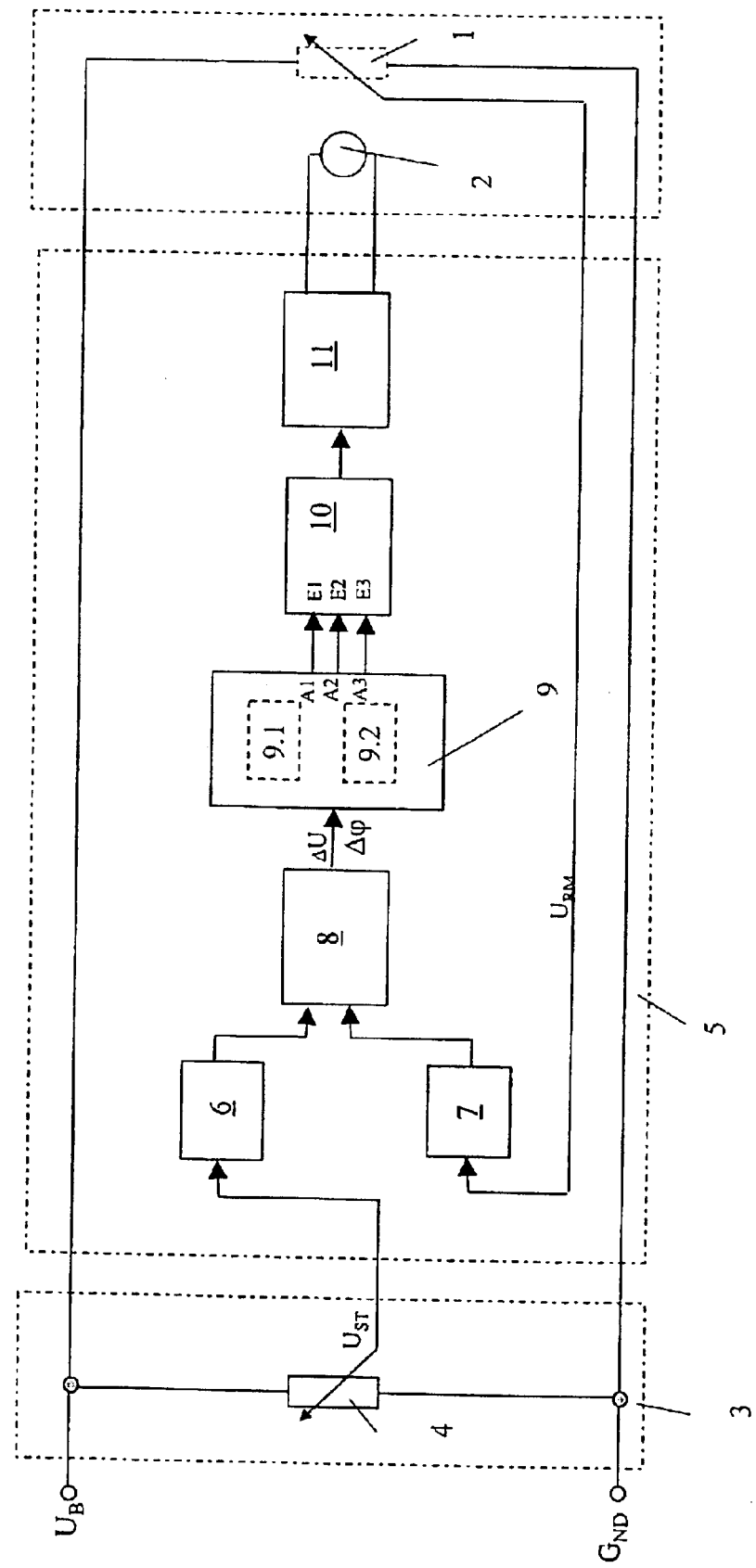

MOTOR CONTROLLER FOR A MOTOR WITH FEEDBACK POTENTIOMETER

This nonprovisional application claims priority under 35 U.S.C. §119(a) on Patent Application No. DE 101 52 996.1 filed in Germany on Oct. 26, 2001, which is herein incorporated by reference.

BACKGROUND OF THE INVENTION

1. Field of the Invention

The present invention relates to a motor controller for a motor with a feedback potentiometer, preferably for central air valve actuation.

2. Description of the Background Art

In the field of climate control, for example for utility vehicles and motor vehicles, the air ducts in heating, air conditioning, and/or ventilation systems have valves to control the flow of air or water. These valves are adjusted either mechanically, e.g. by means of Bowden cables or flexible shafts, or by using motors.

While it is common to use a motor for each valve, a device for adjusting air regulating valves in air conditioners that has cam plates is known from DE 197 16 229 A1, thus making it possible to adjust at least two valves with just one motor.

Also known, from DE 196 07 652 A1, is a transmission for controlling air valves of a heating and/or air conditioning system that only needs one motor to be able to control multiple valves.

SUMMARY OF THE INVENTION

It is therefore an object of the present invention to provide a simple motor controller for a motor with a feedback potentiometer.

The invention is based on the concept of employing a continuous rotation potentiometer and using specially designed control electronics to control a motor with the continuous rotation potentiometer. In the control electronics for the motor controller, the angular difference between an adjusted control potentiometer and the motor feedback potentiometer is determined, in order to determine therefrom the shortest adjustment path to the chosen setpoint position for the motor when the angular difference is greater than 180°.

An undefined region of the feedback potentiometer, which in continuous rotation potentiometers is known to result from the lifting of the wiper at the transition from the beginning to the end of the potentiometer track (or vice versa), is negligibly small and is compensated for by the control electronics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

The single FIGURE is a block diagram illustrating a motor controller for a motor with a feedback potentiometer.

DETAILED DESCRIPTION OF THE PREFERRED EMBODIMENTS

The FIGURE illustrates a schematic block diagram for a central air valve actuation system with a continuous rotation feedback potentiometer 1 for a motor 2 of an air conditioning system (not shown in detail). The air conditioning system has an air conditioner operating device 3, which contains a control potentiometer 4. Control electronics 5 to control the motor 2 are integrated between the motor 2 and the air conditioner operating device 3. The control electronics 5 has two input amplifiers 6, 7, from each of which an output A1 is connected to a differential amplifier 8. On the input side, E1, the input amplifier 6 is connected to the potentiometer tap of the control potentiometer 4, and the input E1 of the input amplifier 7 is connected to the potentiometer tap of the feedback potentiometer 1.

The two input amplifiers are normalized to the operating voltage. In this way, variations and interruptions of the supply voltage are suppressed. The two inputs E1 are normalized as a function of the motor characteristics and known noise voltages of the air conditioner.

The output A1 of the differential amplifier 8 is connected to a comparator 9. The comparator 9 has a special configuration with two window comparators 9.1, 9.2, one of which analyzes the angular difference $\Delta\phi$ received from the voltage difference $\Delta U$ from the differential amplifier 8, and one of which compares against a stored tolerance zone. Therefore, a threshold that is needed to detect the 180° angular difference is stored in the comparator 9. An angular difference less than 180° is detected by comparing the voltage difference with $U_B/2$. If this voltage difference is greater than $U_B/2$, the angular difference is less than 180°. The outputs A1–A3 of the comparator 9 are connected to inputs E1, E2 and E3 of a control logic unit 10. The comparator 9 generates signals for the control logic unit 10, in addition to positive and negative hysteresis, which are needed to control a motor driver 11 which follows the control logic unit 10. The motor driver 11 is electrically connected to the motor 2.

The function of the control electronics 5 is described as follows: Because the control electronics 5 work with a virtual ground, due to the fact that both positive and negative signals are used, the input voltages/signals $U_{ST}$ and $U_{RM}$ provided to the two inputs E1 of the input amplifiers 6, 7 by the control potentiometer 4 and the feedback potentiometer 1, are divided by a voltage divider (not shown in detail) to produce ⅓ $U_{STd}$ and $U_{RMd}$. This measure ensures that the input amplifiers 6,7 have a defined signal $U_D$ in the event of a lifted wiper (rollover between 356° and 360°). To prevent the subsequent stages in the input amplifiers 6,7 from loading this high-resistance voltage divider, decoupling is performed by an impedance converter in each input amplifier 6,7. Each of the input signals that were reduced by a factor of three ($U_{STd}$ and $U_{RMd}$) is added to the virtual ground in the next stage of the input amplifiers 6,7.

These two signals $U_{STd}$ and $U_{RMd}$ are inputted to the differential amplifier 8, which generates a difference $\Delta U$ from them. This difference value $\Delta U$ is provided to the comparator 9, which determines whether the angular difference $\Delta\phi$ between the control potentiometer 4 and the feedback potentiometer 1 is larger or smaller than 180°, i.e. whether the difference $\Delta U$ is larger or smaller than $U_B/2$. If the angular difference is greater than 180°, the motor 2 is adjusted in a direction opposite the rotational movement of the control potentiometer 4. If the angular difference is less than 180°, the motor 2 is adjusted in the same direction of rotation as the control potentiometer 4. This determination directly influences the direction of rotation of the motor 12. The signal resulting from the comparator 9 controls the motor driver 11 and thus the motor 2 through the control logic unit 5 until the difference ΔU is brought into an applicable tolerance zone.

Since the precise position of the motor setting, i.e. the difference between the setpoint and actual values, cannot be achieved, and in order to avoid searching after every adjustment, the tolerance zone is stored in the comparator 9 for monitoring of adjustments.

The control electronics 5 can be integrated in the air conditioner operating device 3 or on or in the motor 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor controller for a motor comprising:
   a feedback potentiometer reporting the angular position of the motor; and
   a control potentiometer for adjusting air regulation, wherein
   the feedback potentiometer is continuously rotatable;
   control electronics are integrated between the motor and the control potentiometer; and wherein
   an angular difference (Δφ) between the adjusted control potentiometer and the feedback potentiometer is determined in the control electronics in order to determine the shortest adjustment path for adjusting the motor to a setpoint position in the event that the angular difference is greater than 180 degrees.

2. The motor controller according to claim 1, wherein the control electronics include:
   two input amplifiers, from each of which an output is electrically connected to a differential amplifier, wherein
   an input of one input amplifier is electrically connected to a potentiometer tap of a control potentiometer, while
   an input of the other input amplifier is connected to a potentiometer tap of a feedback potentiometer, and
   the output of the differential amplifier is connected to a comparator whose outputs are connected to inputs of a control logic unit that is wired to a subsequent motor driver for the motor.

3. The motor controller according to claim 2, wherein the inputs of the input amplifiers are normalized as a function of the motor characteristics and noise voltages of the air conditioner.

4. The motor controller according to claim 3, wherein
   the input signals provided to the two inputs of the input amplifiers by the control potentiometer and the feedback potentiometer are divided by a factor of three by a voltage divider, and each of the input signals divided by a factor of three is added to a virtual ground.

5. The motor controller according to claim 2, wherein
   the comparator has two window comparators, and wherein
   one of the window comparators analyzes an angular difference from the differential amplifier, and the other window comparator compares a tolerance zone stored in the comparator.

6. The motor controller according to claim 5, wherein a threshold value for detecting a 180° angular difference is stored in the comparator.

7. The motor controller according to claim 3, wherein the noise voltages of the air conditioner are known.

8. A method for controlling a motor, said method comprising the steps of:
   reporting an angular position of said motor by a feedback potentiometer being continuously rotatable;
   adjusting air regulation by a control potentiometer;
   determining an angular difference between said adjusted control potentiometer and said feedback potentiometer by control electronics; and
   adjusting said motor to a setpoint position in the event that said angular difference is greater than 180 degrees.

* * * * *